Nov. 25, 1969 C. W. MOORE ET AL 3,480,727

CLOSED CIRCUIT TELEVISION PROTECTION SYSTEM

Filed March 30, 1966 3 Sheets-Sheet 1

Inventors
John L. Waner
Chester W. Moore
BY Pendleton, Neuman,
Seibold & Williams
Attorneys Nov. 25, 1969 C. W. MOORE ET AL 3,480,727

CLOSED CIRCUIT TELEVISION PROTECTION SYSTEM

Filed March 30, 1966 3 Sheets-Sheet 2

Inventors
John L. Waner
Chester W. Moore
BY Pendleton, Neuman, Seibold & Williams
Atty's Inventors John L. Waner
Chester W. Moore
BY Pendleton, Neuman,
Seibold & Williams
Attorneys

United States Patent Office 3,480,727

Patented Nov. 25, 1969

3,480,727

CLOSED CIRCUIT TELEVISION PROTECTION SYSTEM

Chester W. Moore, 15 S. Austin Blvd. 60644, and John L. Waner, 5434 S. Archer Ave. 60638, both of Chicago, Ill.

Filed Mar. 30, 1966, Ser. No. 538,782
Int. Cl. H04n 7/18
U.S. Cl. 178—6 9 Claims

ABSTRACT OF THE DISCLOSURE

This invention relates to a closed circuit television system for use in monitoring a door or other entranceway, to permit recognition of a visitor before the door is opened. The system incorporates a communications system for communicating with the visitor, and a switching network for selectively activating the television monitor, an amplifier, and an audio transducer.

This application relates to closed circuit television systems, and more particularly to such systems which are used in multiple unit dwellings or the like to protect against admission of unauthorized persons to the premises.

Such buildings customarily have an electrically operable door latch on a door separating the lobby or public part of the building from the apartments or the like therein, and the latch is designed to be electrically unlatched, remotely, by closing a switch. A visitor to the building signals his desire to enter by closing a switch in the lobby, which rings a bell in one of the apartments.

Naturally, it is desirable to provide some means of identifying a visitor before he is admitted by remotely opening the door, and many attempts in this direction have been made in the past. In one system, an audio intercommunication device is used, by which the tenant may ask the visitor the nature of his business.

In another system, a television camera is employed to produce a signal which may be received by a conventional television set, and used to produce an image on the television screen corresponding to the object "seen" by the camera. If the visitor does not happen to be facing the camera, however, or is standing out of its field of view, the ordinary television system may not give the tenant sufficient information about the identity of the visitor and the nature of his business, to permit the tenant to make a proper decision as to whether the visitor should be admitted. Moreover, most conventional television sets take a relatively long time to warm up, and by the time the tenant gets a picture on the television screen, the visitor may decide that no one is home, and leave. Also, the television set must be tuned to a channel in which no commercial station is received, and this requires a further operation by the tenant before a useful picture is obtained.

Accordingly, it is a principal object of the present invention to provide a protection system especially adapted for use in a multiple unit dwelling or the like, which overcomes the disadvantages of the systems known in the past.

Another object of the present invention is to provide an intercommunication system in association with a closed circuit television system, so that a two-way conversation can be carried on, between a visitor and a tenant, while a television picture is transmitted in one direction, for the tenant's viewing.

A further object of the present invention is to provide a protection system employing a compact inexpensive monitor unit which may be mounted in a wall, with its viewing screen flush, or nearly flush, with the surrounding wall surface.

Another object of the present invention is to provide a protection system in which the television camera is permanently maintained in operative condition, and the monitor unit is adapted to reproduce the image scanned by the camera instantly.

A further object of the present invention is to provide a protection system having audio transducers located at the camera and at the monitor, an amplifier interconnecting the transducers, and means for maintaining the amplifier in operative condition to amplify the signals produced by the transducer at the camera and transmit them to the transducer at the monitor.

Another object of the present invention is to provide such a system including means for selectively reversing the input and output connections of said amplifier, so that the amplifier amplifies the signals produced by the transducer at the monitor, and transmits them to the transducer at the camera.

A furher object of the present invention is to provide a protection system including a monitor having means for presenting a picture on its viewing screen and for simultaneously allowing an audio transducer at the monitor to reproduce the sounds transmitted from a transducer at the camera unit, and means for selectively connecting the transducer at the camera to reproduce the sounds transmitted from the transducer associated with the monitor.

Another object of the present invention is to provide a protection system in which means for signalling a tenant's apartment, means for remotely unlocking a door, and video and audio communication means are all integrated into a monitor unit.

A further object of the present invention is to provide a portection system having a monitor in which video, audio, and control signals are connected to the monitor through a single connector means, so that the monitor unit may be removed from the system simply and easily by disconnecting said connector means.

Another object of the present invention is to provide a protection system including video and audio communication circuits, and means for preventing cross talk between the video and the audio circuits.

These and other objects and advantages of the present invention will become manifest upon an examination of the accompanying specification and drawings.

In one embodiment of the present invention there is provided a protection system employing a monitor unit having a picture tube and a loudspeaker; a camera disposed at a remote location; and a second loudspeaker disposed at the camera location. Switch means is provided for selectively interconnecting the camera with the picture tube, and the same switch means interconnects the two loudspeakers, with an amplifier for transmission from the loudspeaker at the camera location to the one at the monitor location. A second switch is provided for selectively reversing the direction of communication between the loudspeakers, without disturbing the connection between the camera and picture tube. The components of the monitor are so arranged that interference and cross-talk between the audio and video circuits is minimized, while the entire monitor is contained in a very small physical volume.

The loudspeaker of the monitor is connectable to a tone generator by a remotely actuated push button, and the monitor includes switch means for operating a remote electrical door latch or the like. The monitor also includes switch means to select the area of the building with which visual and audio communication is desired, and the actuation of this switch automatically connects the audio and video circuits, and the remote latch control circuit, to the appropriate apparatus. The system is also arranged so that communication between several remote locations, each having a camera and a loudspeaker, and several monitors, may be carried out independently without interfering with each other.

Reference will now be made to the accompanying drawings in which.

Figure 3:
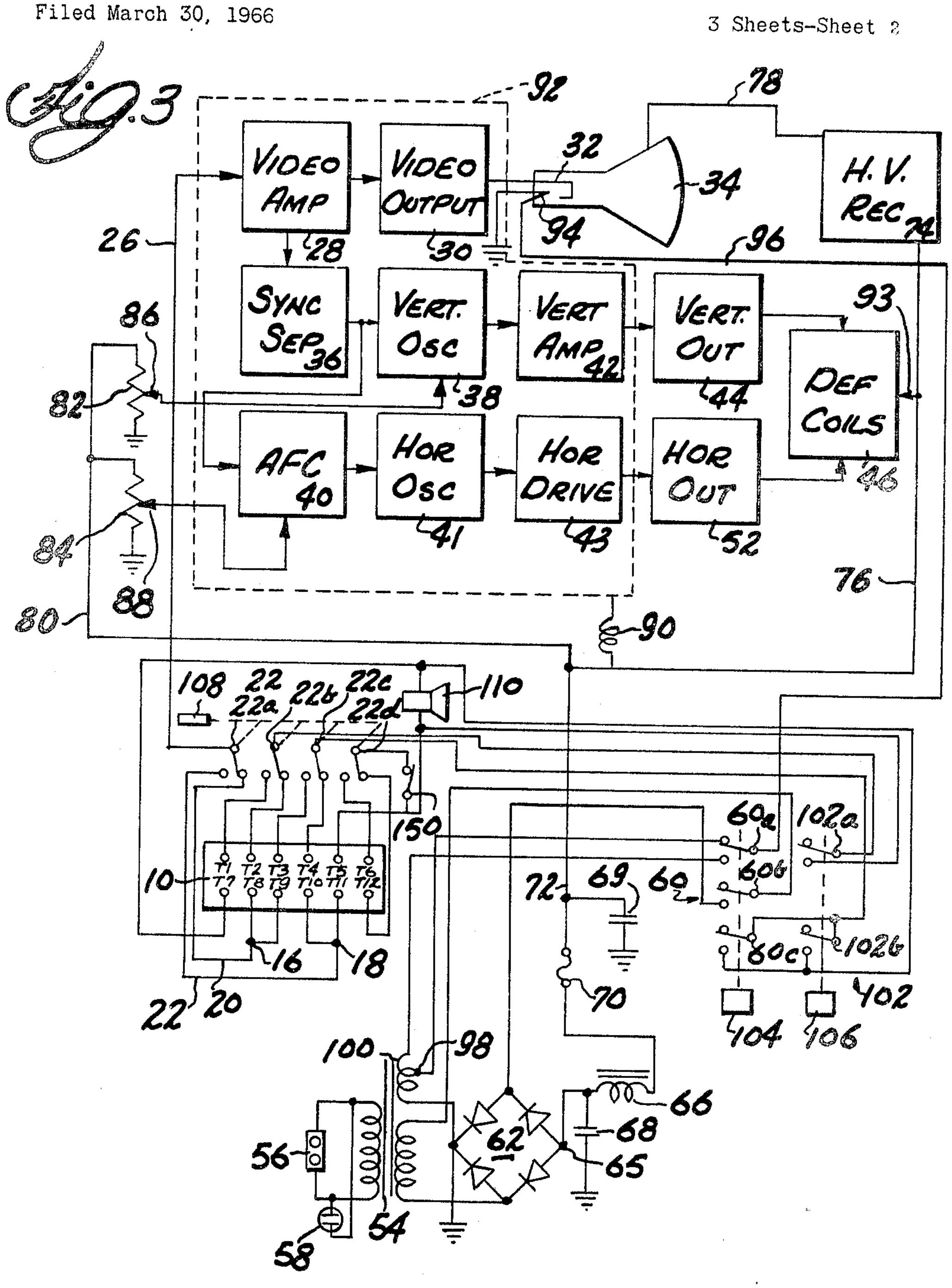
FIG. 3 is a schematic diagram, partly in functional block diagram form, of the monitor illustrated in FIGS. 1 and 2.

Referring first to FIG. 3, the electrical circuitry included within the monitor unit is illustrated. This circuitry is composed of video circuits for utilizing video signals received from a television camera at a remote location, and audio circuits for utilizing the audio signals received from the remote location. The video circuits are illustrated in functional block diagram form in FIG. 3; the actual circuitry within each of the functional blocks may be conventional and forms no part of the present invention.

All of the information and control signals required to operate the monitor are presented to a connector member 10 which is provided with twelve plugs adapted to mate with corresponding sockets in a cooperating connector. The twelve plugs are identified in FIG. 3 as terminals T1 through T12. The twelve plugs cooperate with twelve corresponding sockets in a mating connector (not shown) secured to the ends of two cables leading to two remote locations, as will be more fully described hereinafter. Terminals T8 and T9 are connected together in a junction 16 and terminals 10 and 11 are also connected together in a junction 18. Lines 20 and 22 connect the junctions 16 and 18, respectively, to the stationary contacts of one pole 22*a* of a four-pole double-throw switch 22. The function of switch 22*a* is to select one of the two video signals presented to the unit, viz., the one at the terminals 10 and 11, or the one at the terminals 8 and 9. The video signal is then conveyed by a line 26 to the input of a video amplifier 28. The video amplifier 28 amplifies the video signal and feeds it to a video output stage 30 which further amplifies the signal and then impresses it on the cathode 32 of the kinescope of picture tube 34. The output of the video amplifier 28 is also connected to the sync separator 36 which separates the sync signal transmitted with the video signal. The output of the sync separator 36 is connected to a vertical oscillator 38 and to an automatic frequency control circuit 40. The output of the vertical oscillator 38 is connected through a vertical amplifier stage 42 and a vertical output stage 44 to the vertical deflection coil within the deflection coil assembly 46. The vertical oscillator stage 38 is adapted to develop the necessary signal for causing the vertical deflection coils to adjust the position of the electron beam within the kinescope 34 for each horizontal line to be displayed, and, at the end of each scan, retrace to the opposite side of the tube. The output of the AFC stage 40 is connected to a horizontal oscillator 41 which, in turn, is connected through a horizontal drive stage 43 and a horizontal output stage 52 to the horizontal coils within the deflection coil unit 46. The vertical and horizontal stages combine to cause the kinescope 42 to produce a raster having 525 lines interlaced in two successive cycles, and the frames being displayed at the rate of 30 frames per second. It will be understood by those skilled in the art that the drive for the deflection circuits produces the standard raster employed in commercial television sets.

The power for the unit is derived from a power supply including a transformer 54. The primary of the transformer 54 is connected to line voltage through a plug 56, and a neon tube 58 indicates the presence of power on the transformer primary.

The secondary of the transformer 54 is connected, in series, through one pole 60*b* of a three-pole double-throw switch 60, to a full-wave rectifier 62, which produces a DC voltage between an outlet terminal 65 and ground. The power output of the rectifier 62 is filtered by an inductor 66 and capacitors 68 and 69 connected in the familiar low-pass filter arrangement. A fuse 70 projects the power supply from excessive current drain. A line 72 conveys filtered DC voltage to the component parts of the monitor.

A high voltage rectifier stage 74 is connected to the line 72 by a line 76, and functions to produce high voltage on a line 78 connected to the second anode of the kinescope 34 in the conventional manner. A line 80 connects the line 72 to a pair of potentiometers 82 and 84. The taps of each of the potentiometers 82 and 84, 86 and 88, are connected, respectively, to the vertical oscillator and the AFC, and may be adjusted manually to maintain the synchronization of the vertical and horizontal stages.

An inductor 90 is interconnected between the line 72 and the various components included within the dashed rectangle 92, to supply power to the various stages. The deflection circuit 46, as well as the vertical and horizontal output stages 44 and 52, are powered through a line 93 interconnected with the line 76.

The filament 94 of the kinescope 34 is connected by the line 96 to a pole 60*a* of the switch 60. In the normal position, which is illustrated in FIG. 3, the switch 60*a* connects one end of the filament 94 with a tap 98 of a filament winding 100 of the transformer 54. When the switch 60 is actuated to its other position, however, the filament 94 is connected across the full winding 100.

In the operation of the monitor, the filament 94 of the kinescope 34 is continuously maintained in a heated condition by being connected across part of the winding 100, even when it is not being used. Thus, when the monitor is to be used, the switch 60 is actuated and the full voltage produced across the winding 100 is connected to the filament 94. The emission from the cathode 32 of the kinescope 34 then rises to produce a picture of full brightness on the viewing screen within a very short time—on the order of about two seconds. In addition, the filament 94 is protected against excessive current surges which would be produced by impressing the full filament voltage across the cold filament.

The third pole 60*c* of switch 60 relates to the operation of the intercom unit associated with the monitor, as do all of the poles of a companion switch 102. The switch 60 is energized by a push button 104, and is arranged mechanically to latch the position of the three poles 60*a*, 60*b* and 60*c* in operative position, in the manner well known in the art. A second depression of the push button 104 is effective to return the three poles of the switch 60 to normal or unoperated condition as illustrated in FIG. 3. The switch 102 is operated by a push button 106, but this switch is not equipped with a latch, so that the two poles 102*a* and 102*b* of the switch 102 are closed only while the push button 106 is being depressed.

The switch 22, which has four poles, is operated by a sliding member 108. The mechanical arrangement is such that the position of the slide 108 is stable in either position. As will be described more fully hereinafter, the switch 22 is operable to select one of two remote stations for connection to the monitor, which stations may conveniently correspond to the front and rear entrances of an apartment building or the like. Thus, the switch pole 22*a* is operative to select the video signal generated by either a camera disposed near the front door or a corresponding camera disposed near the rear door, and positioned so as to produce a picture from which the identity of a caller may be recognized.

Figure 4:
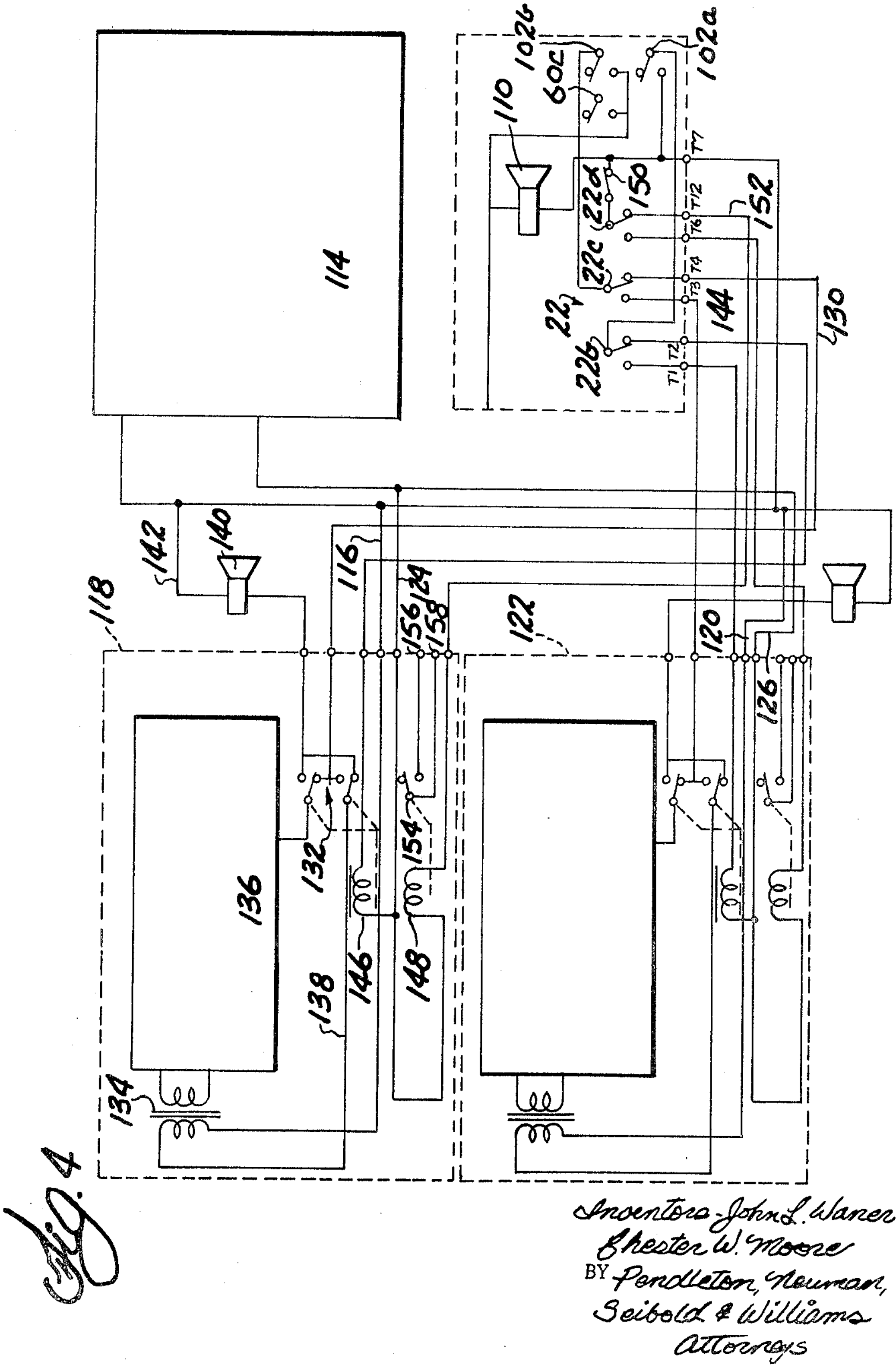
FIG. 4 is a functional block diagram, partly in schematic form, of circuitry for selectively interconnecting the monitor with remote locations.

Referring now to FIG. 4, the various elements of the intercom system are illustrated in functional block form, with portions of the switches 22 and 60 omitted for clarity. A loudspeaker 110 is disposed in the monitor, and is preferably of the permanent magnetic type so that it can operate as a bilateral transducer to either reproduce sound from an electrical signal, or to generate an electrical signal in response to detected sound. One terminal of the loudspeaker 110 is connected to a reference voltage at a terminal 112. The reference voltage is produced by a power supply 114 which may be disposed at any convenient location. A line 116 connects the reference potential of the power supply 114 to apparatus associated with one remote unit included within the dashed rectangle 118, and a second line 120 connects reference voltage to the other remote station enclosed within the dashed rectangle 122. Similarly, a line 124 interconnects the high voltage terminal of the power supply 114 with the remote unit 118, and a corresponding lead 126 connects that terminal with the remote unit 122.

The other terminal of the loudspeaker 110 is connected through either of two poles of the switch 60 to a line 128 which is connected to the pole 22*c* of the switch 22. The switch 22 is illustrated as positioned to select the remote unit 118.

In the condition illustrated, the pole 22*c* is connected by a line 130 through one pole of a double-pole double-throw reversing switch 132 to the output terminal of an amplifier 136. The secondary of an impedance matching transformer 134 is connected to the input of the amplifier 136, and its primary is connected to a line 138, through the other pole of the reversing switch 132, to one terminal of a loudspeaker 140, disposed near the remote location in a place where it can function as a bilateral audio transducer. The other terminal of the loudspeaker 140 is connected to the reference potential by a line 142, and the other terminal of the primary of the transformer 134 is also connected to the reference potential. The amplifier 136 is operative to amplify the electrical signals generated by the loudspeaker 140 and feed them to the loudspeaker 110, which reproduces sounds at the monitor location.

The apparatus may be energized to selectively cause the amplifier 136 to amplify signals in the opposite direction, namely, to amplify signals produced by the loudspeaker 110 and apply them to the loudspeaker 140. The pole 102*a* of switch 102 is effective to perform this function. The pole 102*a* has one of its terminals connected to the terminal 112, at reference potential. The other terminal of the pole 102*a* is connected through the switch 22*b* to a line 144. The remote end of the line 144 is connected to one terminal of a relay coil 146, and the other terminal of the relay coil 146 is connected to the line 124 which has been described above as carrying the high voltage from the power supply 114. Thus, the operation of the switch 102*a* energizes the relay coil 146 to reverse the condition of the reversing switch 132. The loudspeaker 110 is then connected through the reversing switch 132 to the input transformer 134 of the amplifier 136, and the output of the amplifier 136 is connected through the reversing switch 132 to the loudspeaker 140.

In operation, the apparatus is energized by depressing the push button 104, which latches the switch 60 in operated condition, connecting the power supply unit 62 with the remainder of the monitor circuitry, and raising the filament voltage on the kinescope 32. Very shortly, a picture appears on the viewing screen of the kinescope which is being transmitted from the remote location. The pole 60*c* also connects the loudspeaker 110 to the output of the amplifier 136, so that the loudspeaker 110 is immediately effective to reproduce sound without any warm-up time whatever. When the push button 106 is operated, and held in, the switch 132 is reversed, and the loudspeaker 110 is connected to the input of the amplifier 136, whether the switch 60 is depressed or not. The normal mode of operation, in which switch 60 is actuated, produces the desirable result that no relay or key click is audible at the remote location, and so the visitor has no way of determining whether his conversation, noise, or the like is being monitored.

The remote location 118 includes a second relay coil 148, which may be energized by a switch 150 at the monitor. The switch 150 is a single-pole single-throw switch, one terminal of which is connected to the reference voltage at terminal 112. The other terminal is connected to the pole 22*d* of switch 22 and through that switch to a lead 152. The lead 152 is connected to one terminal of the relay coil 148 at the remote location 118, and the other terminal of the relay coil 148 is connected to the high voltage terminal of the power supply 114 by the line 124. When the switch 150 is closed, the relay 148 is energized, thereby closing a single-pole single-throw switch 154, the terminals of which are connected to terminals 156 and 158. The terminals 156 and 158 are connected to an electrical door lock and a suitable power source (not shown), so that the door may be remotely unlocked by closing the switch 150 at the site of the monitor.

The constituent parts of the apparatus disposed at the remote location 122 are identical with those at the remote location 118. It will be appreciated, however, that the operation of a single switch, namely, switch 22, is effective to select the desired video signal, the amplifier unit at the location of the source of the video signal, the door opening relay 148 at that location, and the reversing coil 146 associated with the amplifier at that location. The facilities at the remote stations 118 and 122 are completely independent, and isolated from each other, and one monitor may be communicating with the remote stations 118, for example, while a second is communicating with the other remote station 122, without any interference with each other. It will also be appreciated that the amplifier 136 at the remote location is always energized, and the monitor switch 102 is normally positioned to receive communication from the remote station.

Figure 1:
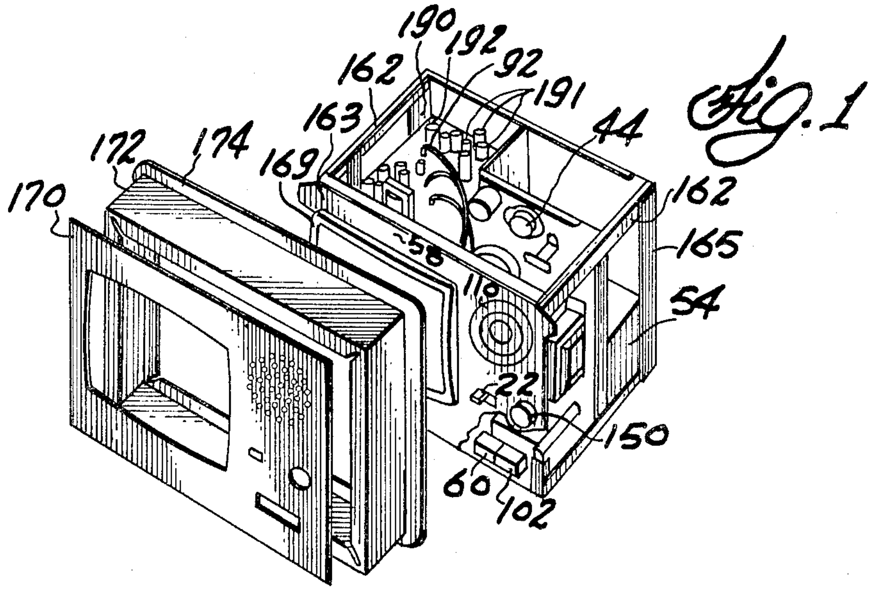
FIG. 1 is an exploded perspective view of a monitor comprising an exemplary embodiment of the present invention.
Figures 2, 5:
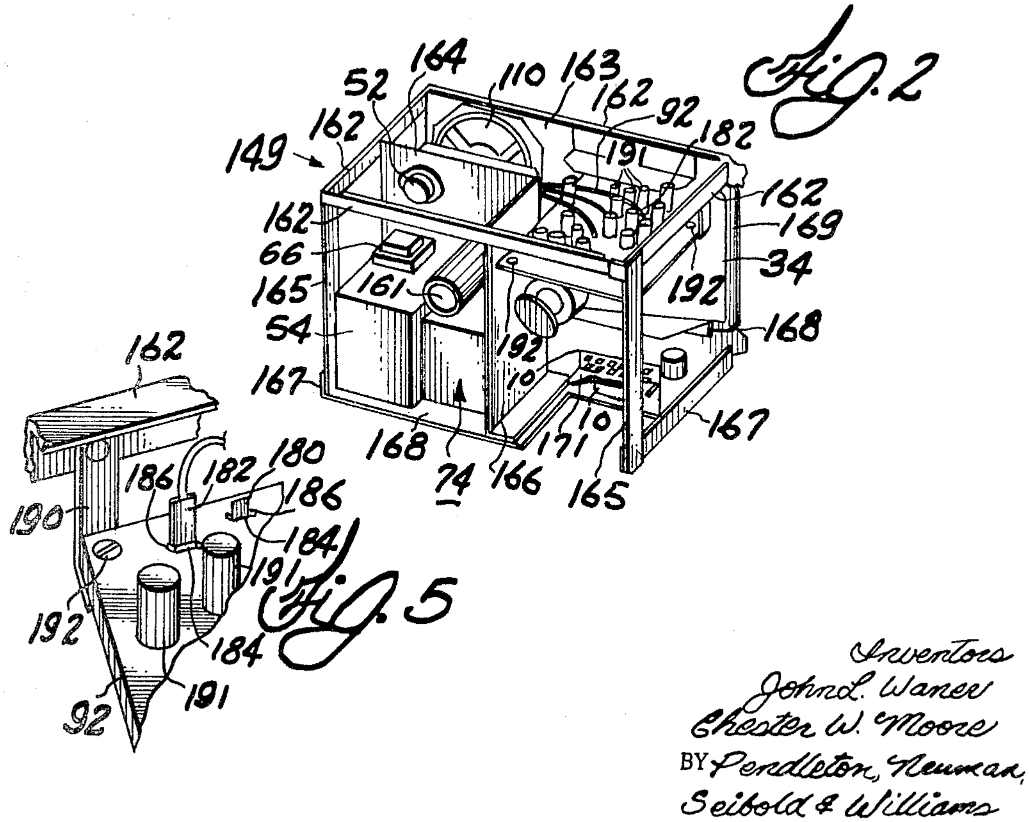
FIG. 2 is a rear perspective view of the monitor illustrated in FIG. 1.
FIG. 5 is a fragmentary perspective view of a detail of the construction of the monitor.

Referring now to FIGS. 1 and 2, the mechanical construction of the monitor is illustrated. The arrangement of kinescope 34 is best illustrated in FIG. 2, and it extends generally between the front and the rear of the monitor unit 149 on one side thereof. Disposed above the kinescope 34 is a circuit board 92 which contains all of the components contained within the dashed line 92 in FIG. 3. The speaker unit 110 is mounted on the front of the unit adjacent the face of the kinescope 34 and toward the upper portion of that side. Below the speaker 110 is disposed the sliding member 108 which controls the switch 22, and the single-pole switch 150, which is push-button actuated. The push-buttons 104 and 106 for the switches 60 and 102 are disposed in side-by-side relation beneath the sliding member 108 and push-button switch 150.

The frame of the monitor is composed, generally, of a series of L-shaped members 162 interconnected with a front panel 163 so as to form a rectangle. The kinescope 34 is clamped to an escutcheon 169, which is mounted on the panel 163. A pair of struts 165 connect corners of the rectangle to corresponding corners of a bottom panel 168, which has its end edges 167 turned up to form flanges which are rigidly connected to the struts 165 and the front panel 162. One corner of the unit is isolated by a pair of sheet metal panels 164 and 166, which are connected to the bottom panel 168. The panel 164 serves as a heat sink for power transistors associated with the vertical output stage 44 and the horizontal output stage 52. A can 161 containing the high voltage rectifier tube associated with the high voltage rectifier stage 74 and a filter choke 66 are also mounted on the wall 164. The power transformer 54 and a metal can 74 enclosing the high voltage rectifier circuit are mounted on the bottom panel within the corner isolated by the walls 164 and 166. The connector 10 and the plug 56 are separated by a shield 171 and are mounted on the bottom panel 168 at a location beneath the neck of the kinescope 34. The bottom panel 168 has a rectangular notch cut from the corner adjacent the connector 10 and plug 58.

The circuit board 92 is supported at each of two corners by a bracket 190, to which it is secured by a screw 192 (FIG. 5). The brackets 190 are secured to the frame members 162. The other two corners are supported by a bracket 194 secured to the side panel 166. All of the connections to the circuit board 92, by which the circuit board is connected to the synchronization potentiometers 82 and 84, the horizontal and vertical output stages 52 and 44, the kinescope 34, and the power supply, are made by slip connectors 180 and 182, as illustrated in FIG. 5. The male connectors 180 are mounted in apertures 184 in the board 92, and maintained in position by bent tabs 186. The connectors may be conveniently disconnected without the necessity of having to unsolder any leads connecting the circuit board 92 to the other elements of the monitor. Thus, any repair or maintenance which may be necessary relative to the circuit board 92 may be conveniently effected merely by disconnecting the connectors 180 and 182, and the four screws 192, whereby the circuit board 92 may be removed from the monitor for examination and/or repair. While the circuit board 92 is absent from the monitor, a like unit may be substituted therefor simply by interconnecting the plug connectors of the circuit board 92. The components 191 of the circuits are mounted on the surface of the board 92.

All of the connections between the monitor unit and the remote stations 118 and 122 are made through the connector unit 10, and the monitor may be conveniently disconnected from all of these leads merely by disconnecting the connector 10. The only power connection is through the plug 56. This facilitates removal of the monitor from its location in case it is necessary to repair and/or service any elements of the monitor aside from those contained on the circuit board 92.

The monitor is designed for mounting in a wall, and may be mounted either flush with the surface of the wall, or with the front end of the monitor projecting slightly beyond the surface of the wall. The type of installation depends on the available wall thickness, or the availability of space beyond the wall into which the rear end of the monitor may project.

A face panel 170 of the monitor is adapted to be secured directly to the front of the front panel 163 to permit the monitor to be mounted flush with a surrounding wall. Alternatively, a decoration ring 172 may be interposed between the front panel 163 and the face panel 170 in order to enclose the front portion of the monitor which projects beyond the plane of the wall. The decoration ring 172 is provided with four sides which closely surround the top, bottom and two end sides of the monitor and a surrounding flange 174 which is adapted to cooperate with the surface of the surrounding wall.

Although a single monitor unit has been described in conjunction with the protection system, it will be understood that any number of monitor units may be connected into the circuit of FIG. 4, simply by interconnecting their twelve terminals T1 to T12.

From the foregoing an illustrative embodiment of the present invention has been described in sufficient detail as to enable others skilled in the art to make and use the same and, by applying current knowledge, to adapt the same for use in a variety of conditions of service, without departing from the essential features of novelty thereof which are intended to be defined and secured by the appended claims.

What is claimed is:

1. In a closed circuit television system, a monitor comprising a kinescope, means for selectively representing a picture on the viewing screen of said kinescope in accordance with an electrical input signal, said last named means including means for holding the filament of said kinescope in a heated condition and a first switch for selectively applying an electrical signal to a control electrode of said kinescope, a loudspeaker, and connecting means responsive to the actuation of said switch for completing an electrical circuit to said loudspeaker, said connecting means comprising a second switch for selectively connecting said loudspeaker to a first terminal when said first switch is actuated and said second switch is not actuated, and to a second terminal when said second switch is actuated.

2. Apparatus according to claim 1, including a third switch for selectively connecting said kinescope when said first switch is actuated, to one of a plurality of input terminals, and for simultaneously connecting said loudspeaker to one of a plurality of pairs of separate terminals, one pair for each of said plurality of input terminals.

3. In a closed circuit television system, a monitor comprising a kinescope, means for selectively representing a picture on the viewing screen of said kinescope in accordance with an electrical input signal, said last named means including means for holding the filament of said kinescope in a heated condition and a first switch for selectively applying an electrical signal to a control electrode of said kinescope, a loudspeaker, connecting means responsive to the actuation of said switch for completing an electrical circuit to said loudspeaker, camera means for generating said electrical input signal and for continuously providing said input signal to said monitor, an audio transducer disposed near said camera, amplifier means for amplifying electrical audio signals generated by said transducer and for continuously providing said audio signals to said monitor, and means for selectively connecting said transducer to the input or to the output of said amplifier and for simultaneously connecting the output or input, respectively of said amplifier to said loudspeaker.

4. In a closed circuit television system, a monitor comprising a kinescope, means for selectively representing a picture on the viewing screen of said kinescope in accordance with an electrical input signal, said last named means including means for holding the filament of said kinescope in a heated condition and a first switch for selectively applying an electrical signal to a control electrode of said kinescope, a loudspeaker, and first connecting means responsive to the actuation of said switch for completing an electrical circuit to said loudspeaker, camera means for generating said electrical input signal and for continuously providing said input signal to said monitor, an audio transducer disposed near said camera, and amplifier means for amplifying electrical audio signals generated by said transducer and for continuously providing said audio signals to said monitor, said first connecting means comprises a second switch for selectively connecting said loudspeaker to said amplifier when said first switch is actuated and said second switch is not actuated, and to a second terminal when said second switch is actuated.

5. Apparatus according to claim 4, including a plurality of camera means, a plurality of audio transducers each disposed near one of said cameras, amplifier means for each of said transducers, and a third switch for selectively connecting said kinescope, when said first switch is actuated, to one of said cameras, and for simultaneously connecting said loudspeaker to the output of the amplifier associated with the transducer disposed near said one camera when said first switch is actuated and said second switch is not actuated, and to the input of said amplifier when said second switch is actuated.

6. Apparatus according to claim 5, including a plurality of said monitors with their audio terminals connected together and with their video terminals connected together.

7. In a closed circuit television system, a monitor comprising a kinescope, means for selectively representing a picture on the viewing screen of said kinescope in accordance with an electrical input signal, said last named means including means for holding the filament of said kinescope in a heated condition and a first switch for selectively applying an electrical signal to a control electrode of said kinescope, a loudspeaker, and connecting means responsive to the actuation of said switch for completing an electrical circuit to said loudspeaker, said means for selectively presenting a picture including a video amplifier circuit for amplifying said input signals and circuit means for generating sweep signals for said kinescope, means for mounting said circuits on an integral circuit board, a plurality of selectively disconnectable connectors coupling the circuits mounted on said board with said kinescope and with said input signals, and means for removably securing said board in fixed relation with said kinescope.

8. Apparatus according to claim 7, wherein one of said connectors comprises a male connector member secured in fixed relation to said board and electrically connected with one of said circuits mounted on said board, and a female connector for coupling with said male connector member and electrically connected with one end of a wire, the other end of said wire being electrically connected with said kinescope.

9. Apparatus according to claim 12, including a frame for supporting said board in fixed relation adjacent and above said kinescope and aligned parallel to the axis of said kinescope, a front panel secured to said frame and supporting said kinescope with its viewing screen aligned generally in the plane of said front panel, said front panel having an aperture adjacent one side of said kinescope, means for supporting said loudspeaker on said front panel behind said aperture, a bottom panel secured to said frame, connector means disposed on said bottom panel beneath said kinescope for connecting to a source of said input signals, a first shield disposed behind said loudspeaker and connected with said bottom panel, a second shield disposed perpendicular to said first shield beside said board and connected with said bottom panel, a high voltage power supply, means for connecting said power supply with said kinescope, a power transformer, means for connecting said power transformer with the circuits mounted on said board, said means for generating sweep signals including a power amplifier, and means for mounting said power supply, said power transformer and said power amplifier in the space defined by said bottom panel and said first and second shields, to prevent interference between the audio and video circuits of said monitor.

References Cited

UNITED STATES PATENTS 3,373,364 3/1968 Tumarkin et al. ------ 328—270

OTHER REFERENCES

R.C.A. Closed Circuit Television Systems, p. 45 and pp. 182–186, Section V, Book I.

ROBERT L. GRIFFIN, Primary Examiner

B. LEIBOWITZ, Assistant Examiner

U.S. Cl. X.R.

328—270

UNITED STATES PATENT OFFICE
CERTIFICATE OF CORRECTION

Patent No. 3,480,727 November 25, 1969

Chester W. Moore et al.

It is certified that error appears in the above identified patent and that said Letters Patent are hereby corrected as shown below:

Column 2, line 34, "portection" should read -- protection --. Column 9, line 20, "claim 12" should read -- claim 8 --.

Signed and sealed this 10th day of March 1970.

(SEAL)
Attest:

Edward M. Fletcher, Jr.
Attesting Officer

WILLIAM E. SCHUYLER, JR.
Commissioner of Patents